US010291109B2

(12) United States Patent
Huang et al.

(10) Patent No.: US 10,291,109 B2
(45) Date of Patent: May 14, 2019

(54) CRITICAL-MODE-BASED SOFT-SWITCHING TECHNIQUES FOR THREE-PHASE BI-DIRECTIONAL AC/DC CONVERTERS

(71) Applicant: Virginia Tech Intellectual Properties, Inc., Blacksburg, VA (US)

(72) Inventors: Zhengrong Huang, Blacksburg, VA (US); Zhengyang Liu, Blacksburg, VA (US); Fred C. Lee, Blacksburg, VA (US); Qiang Li, Blacksburg, VA (US); Furong Xiao, Beijing (CN)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 15/868,486

(22) Filed: Jan. 11, 2018

(65) Prior Publication Data

US 2018/0205306 A1 Jul. 19, 2018

Related U.S. Application Data

(60) Provisional application No. 62/447,649, filed on Jan. 18, 2017.

(51) Int. Cl.
*H02M 1/12* (2006.01)
*H02M 7/21* (2006.01)
(Continued)

(52) U.S. Cl.
CPC ........... *H02M 1/083* (2013.01); *H02M 1/126* (2013.01); *H02M 7/219* (2013.01); *H02M 7/797* (2013.01);
(Continued)

(58) Field of Classification Search
CPC ...... H02M 1/126; H02M 7/217; H02M 7/797; H02M 7/5387; H02M 7/53871
See application file for complete search history.

(56) References Cited

U.S. PATENT DOCUMENTS

2004/0047166 A1* 3/2004 Lopez-Santillana ......................... H02M 1/4225 363/89
2013/0336010 A1* 12/2013 Saxena ................... H02M 1/12 363/13
(Continued)

OTHER PUBLICATIONS

Solar inverters, SMA America, http://www.sma-america.com/products/solarinverters.html, accessed at https://web.archive.org/web/20170919172048/http://www.sma-america.com/products/solarinverters.html (Sep. 19, 2017).
(Continued)

*Primary Examiner* — Timothy J. Dole
*Assistant Examiner* — Sisay G Tiku
(74) *Attorney, Agent, or Firm* — Thomas | Horstemeyer, LLP; Carin R. Miller; Jason M. Perilla

(57) ABSTRACT

Critical-mode soft-switching techniques for a power converter are described. In one example, a power converter includes a converter electrically coupled between an alternating current (AC) power system and a direct current (DC) power system, where the converter includes a number of phase legs. The power converter can also include a control system configured, during a portion of a whole line cycle of the AC power system, to clamp a first phase leg of the converter from switching and operate second and third phase legs of the converter independently in either critical conduction mode (CRM) or in discontinuous conduction mode (DCM).

20 Claims, 16 Drawing Sheets

(51) Int. Cl.

| | |
|---|---|
| ***H02M 7/797*** | (2006.01) |
| ***H02M 7/5387*** | (2007.01) |
| ***H02M 1/08*** | (2006.01) |
| ***H02M 7/219*** | (2006.01) |
| *H02M 1/00* | (2006.01) |

(52) U.S. Cl.
CPC .. *H02M 2001/0058* (2013.01); *Y02B 70/1491* (2013.01)

(56) References Cited

U.S. PATENT DOCUMENTS

2015/0200623 A1* 7/2015 Kang ...................... H02S 40/32 320/101
2015/0236599 A1* 8/2015 Park .................. H02M 3/33507 363/21.17
2016/0029451 A1* 1/2016 Schijffelen ......... H05B 33/0809 315/193
2017/0025993 A1* 1/2017 Kang ...................... H02S 30/10
2017/0117746 A1* 4/2017 Kang ...................... H02J 7/007

OTHER PUBLICATIONS

PV inverters, Yaskawa Solectria Solar, https://solectria.com/pv-inverters/, accessed at https://web.archive.org/web/20171218204602/https://solectria.com/pv-inverters/ (Dec. 18, 2017).

Solar inverters, ABB, http://new.abb.com/power-converters-inverters/solar, accessed at https://web.archive.org/web/20171209100147/http://new.abb.com/power-converters-inverters/solar (Dec. 9, 2017).

PV inverters, Sungrow, http://en.sungrowpower.com/product/, accessed at https://web.archive.org/web/20170730101209/http://en.sungrowpower.com/product/ (Jul. 30, 2017).

C. DiMarino, Z. Chen, M. Danilovic, D. Boroyevich, R. Burgos and P. Mattavelli, "High-temperature characterization and comparison of 1.2 kV SiC power MOSFETs," Energy Conversion Congress and Exposition (ECCE), 2013 IEEE, Denver, CO, 2013, pp. 3235-3242.

C. DiMarino, Z. Chen, D. Boroyevich, R. Burgos and P. Mattavelli, "Characterization and comparison of 1.2 kV SiC power semiconductor devices," Power Electronics and Applications (EPE), 2013 15th European Conference on, Lille, 2013, pp. 1-10.

Z. Liu, B. Li, F. C. Lee and Q. Li, "Design of CRM AC/DC Converter for Very High-Frequency High-Density WBG-Based 6.6kW Bidirectional On-Board Battery Charger," published in Proc. IEEE Energy Convers. Congr. Expo., 2016.

D. Zhang, Q. Zhang, H. Hu, k Grishina, J. Shen, and I. Batarseh, "High efficiency current mode control for three-phase micro-inverters," in Proc. IEEE Energy Appl. Power Electron. Conf. Expo., Feb. 2012, pp. 892-897.

D. Leuenberger, D. Christen, and J. Biela, "Triangular Current Mode Operation of a Three Phase Interleaved T-Type Inverter for Photovoltaic Systems," in Proc. PCIM Europe, May 8-10, Nuremberg, 2012.

J. W. Kolar and U. Drofenik, "A new switching loss reduced discontinuous PWM scheme for a unidirectional three-phase/switch/level boost-type PWM (VIENNA) rectifier," Telecommunication Energy Conference, 1999. INTELEC '99. The 21st International, Copenhagen, 1999, pp. 490 pp..doi: 10.1109/INTLEC.1999.794128.

T. Ishii and Y. Mizutani, "Power factor correction using interleaving technique for critical mode switching converters," in Proc. 29th Annu. IEEE Power Electron. Specialists Conf., May 1998, pp. 905-910.

L. Huber, B. T. Irving, and M. M. Jovanovic, "Open-loop control methods for interleaved DCM/CCM boundary boost PFC converters," IEEE Trans. Power Electron., vol. 23, No. 4, pp. 1649-1657, Jul. 2008.

Z. Liu, Z. Huang, F. C. Lee and Q. Li, "Digital-Based Interleaving Control for GaNBased MHz CRM Totem-Pole PFC," in IEEE Journal of Emerging and Selected Topics in Power Electronics, vol. 4, No. 3, pp. 808-814, Sep. 2016.

A. M. Hava, R. J. Kerkman and T. A. Lipo, "A high-performance generalized discontinuous PWM algorithm," in IEEE Transactions on Industry Applications, vol. 34, No. 5, pp. 1059-1071, Sep./Oct. 1998.

* cited by examiner

CRITICAL-MODE-BASED SOFT-SWITCHING TECHNIQUES FOR THREE-PHASE BI-DIRECTIONAL AC/DC CONVERTERS

CROSS-REFERENCE TO RELATED APPLICATIONS

This application claims the benefit of U.S. Provisional Application No. 62/447,649, filed Jan. 18, 2017, the entire contents of which is hereby incorporated herein by reference.

BACKGROUND

Power conversion is related to the conversion of electric power or energy from one form to another. Power conversion can involve converting between alternating current (AC) and direct current (DC) forms of energy, changing the voltage, current, or frequency of energy, or changing some other aspect of energy from one form to another. Inverters and rectifiers can be used in power converters to control the direction in which power flows, where an inverter acts to convert power from DC power to AC power and a rectifier acts to convert power from AC power to DC power.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
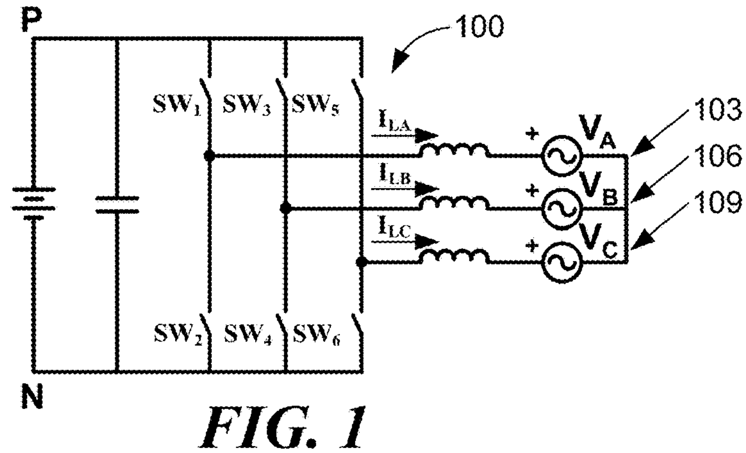
FIG. 1 illustrates an example three-phase H-bridge structure according to various examples described herein.

Modulation for three-phase bi-directional AC/DC converters can achieve soft switching and thus improve converter efficiency, especially for high-density-driven high switching frequency operation. In spite of variable switching frequency operation, this type of modulation has narrow switching frequency variation range, which reduces switching related loss. This type of modulation can also be applied in both inverter mode and rectifier mode, can be applied in both unity power factor condition and non-unity power factor condition, and can be applied in both non-interleaved and two-channel-interleaved operation.

Three-phase inverters/rectifiers are widely used in grid-tied power applications, such as photovoltaic (PV) inverter systems, electric vehicle (EV) charging stations, energy storage systems, and data centers. For example, commercial PV string inverter systems can have a DC/AC stage with a peak efficiency as high as 97%~99% and a power density around 3~15 W/in$^3$ using silicon insulated gate bipolar transistor (Si IGBT) power semiconductor devices and operating at around 20 kHz switching frequency. However, since 20 kHz is close to the frequency limit of Si IGBT devices, the improvement in system power density is thus limited.

With the emergence of wide-bandgap (WBG) power semiconductor devices, the switching frequency can be pushed higher and good performance is still achievable. Between the WBG devices and Si devices with similar voltage and current levels, WBG devices have better figure-of-merit (FOM), and thus, smaller device related loss compared with Si devices under the same operating conditions. With significantly higher switching frequency, size reduction of passive components, such as inductors, harmonic and electromagnetic interference (EMI) filters, becomes possible, which brings a significant improvement in system power density.

For WBG devices, the per-cycle turn-off energy is much smaller than the per-cycle turn-on energy. This feature makes critical conduction mode (CRM) the preferred mode of operations for WBG devices. With CRM operation, zero-voltage-switching (ZVS) is achievable. ZVS eliminates high turn-on loss and reduces the total device related loss, although the turn-off loss and conduction loss can be slightly affected due to the increase of current ripple. With soft-switching, the switching loss of the devices becomes small and high system efficiency is achieved, especially when the system is operating at high switching frequencies in the range of hundreds of kHz. Therefore, soft-switching is key to achieve high system efficiency at high switching frequency operation. CRM operation is an effective way to achieve soft switching without adding physical complexity to the system.

According to the concepts described herein, high-frequency CRM control has been successfully implemented to achieve soft switching and a good power factor on a single-phase inverter/rectifier. With inductor current zero-crossing-detection (ZCD) and programmed off-time ($T_{off}$) extension, whole-line zero-voltage-switching (ZVS) soft switching turn-on can be achieved to reduce switching loss and improve efficiency. With average current mode control, good power factor and low total harmonic-distortion (THD) can be achieved. Experimental results show that, with this high-frequency CRM control, 98.5% peak efficiency can be achieved with a switching frequency above 300 kHz.

In single-phase inverters/rectifiers, CRM soft switching is beneficial for high-frequency operation. In a three-phase inverter/rectifier system, however, only two among the three phases are independent since the summation of current in the three phases is always zero. Thus, independent CRM control cannot be achieved in all three phases at the same time. This is a challenge for CRM control in three-phase inverter/rectifier systems.

A three-phase CRM method using split capacitors at the DC side and connecting the middle point of the DC side with the neutral point of the AC grid was considered. With this connection, the three phases are decoupled, meaning that the current in each phase is dependent only on the switching actions in that phase and not on the switching actions in the other two phases. Thus, each phase is independent on the other two phases and each phase can be independently controlled as CRM operation. Three-phase H-bridge and three-level T-type structures were also both considered. The three-phase CRM method was shown to work at tens of kHz switching frequency level operation and low modulation index condition, where the modulation index is defined as the ratio of AC line-to-line peak voltage to DC voltage. When applied at hundreds of kHz and high modulation index, a very wide switching frequency variation range was shown. Under a typical operating condition (e.g., $V_{DC}$=800V, $V_{AC,\ L\text{-}L\ (RMS)}$=480V) with minimum switching frequency at 300 kHz, the peak switching frequency reaches at least 6 MHz, causing significantly large switching related loss. Therefore, this three-phase CRM method to decouple three phases is not suitable for high frequency and high modulation index designs.

In the context outlined above, a high frequency, high modulation index discontinuous pulse width modulation (DPWM) design is considered for use in three-phase systems. With DPWM, one phase is clamped to the positive or negative DC bus while the other two phases operate based on high-frequency pulse width modulation (PWM) at any instant in the line cycle. As an example for the following analysis, a three-phase two-level H-bridge structure 100 is shown in FIG. 1. The structure 100 is a simple topology for a three-phase inverter/rectifier. As shown, Phase A 103 is associated with voltage $V_A$ (line-to-neutral) and switches $SW_1$ and $SW_2$ in the H-bridge structure 100. Phase B 106 is associated with voltage $V_B$ (line-to-neutral) and switches $SW_3$ and $SW_4$ in the H-bridge structure 100. Phase C 109 is associated with voltage $V_C$ (line-to-neutral) and switches $SW_5$ and $SW_6$ in the H-bridge structure 100.

Figure 2A:
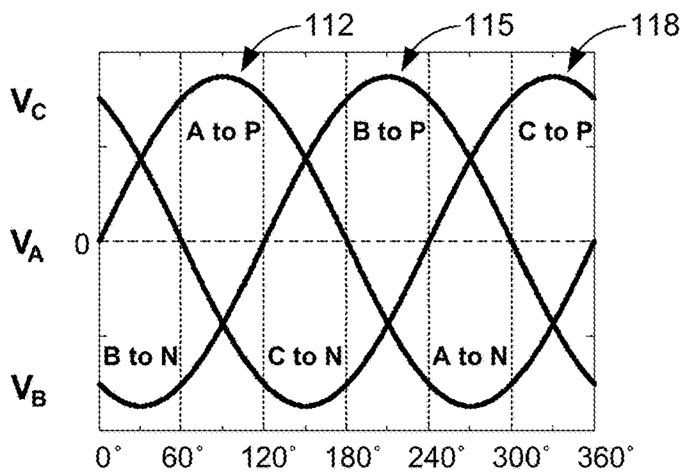
FIG. 2A illustrates an example of line cycle discontinuous pulse width modulation (DPWM) clamping options for the three-phase H-bridge structure shown in FIG. 1 according to various examples described herein

FIG. 2A illustrates an example of line cycle discontinuous DPWM clamping options for the three-phase H-bridge structure 100 shown in FIG. 1. The three phases in the whole line are shown in FIG. 2A. Particularly, voltage $V_A$ 112, voltage $V_B$ 115, and voltage $V_C$ 118 are shown for a whole cycle. In one example case, the whole cycle can be equally divided into six time intervals, each 60 degrees, to determine the DPWM clamping options. The peak and polarity of the AC side line-to-neutral voltage can be evaluated in each 60-degree time interval of the line cycle. For example, during the 0~60 degree interval, the peak voltage occurs in Phase B 106, and it has negative polarity denoted as "B to N" in FIG. 2A.

Figure 2B:
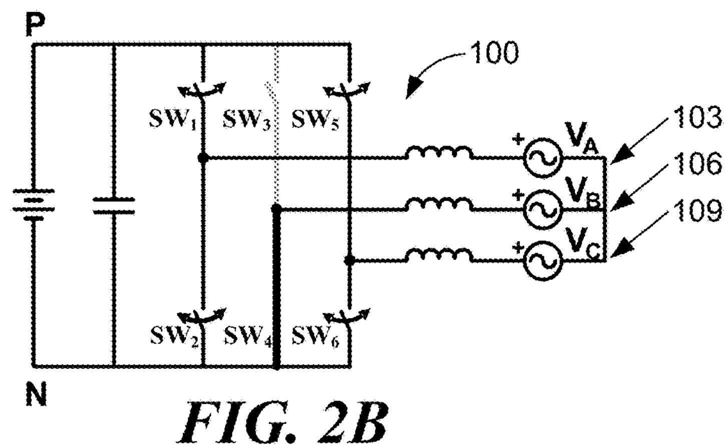
FIG. 2B illustrates an example of a 0~60 degree DPWM clamping option for the three-phase H-bridge circuit shown in FIG. 1 according to various examples described herein.

FIG. 2B illustrates an example of a 0~60 degree DPWM clamping option for the three-phase H-bridge structure 100 shown in FIG. 1. As shown, Phase B 106 is clamped to the negative DC bus (i.e., $SW_4$ closed with $SW_3$ left open) in the structure 100. Phase B 106 is clamped to N for the entire 0~60 degree time interval as shown in FIG. 2A, while the other two phases are still operating at high frequency PWM.

Continuing the process, during the 60~120 degree interval, Phase A 103 is clamped to the positive DC bus (i.e., $SW_1$ closed with $SW_2$ left open), as denoted by "A to P" in FIG. 2A. Accordingly, for the remaining intervals, the phase that reaches the peak and polarity of AC side line-to-neutral voltage can be evaluated in each 60-degree time interval of the line cycle.

With DPWM, the phase operating in clamping mode is uncontrolled (the top or bottom switch is always ON during 60-degree time interval), while the other two phases can be independently controlled. The summation of current in these two phases determines the current in the phase operating at clamping mode. Therefore, DPWM can be adopted as a method of decoupling, enabling the other two phases to be independently controlled by CRM operation, which is more important than the original purpose of the DPWM clamping—to reduce switching loss because of the clamping around the peak of AC voltage (and thus the peak of AC current under unity power factor condition).

Figure 3:
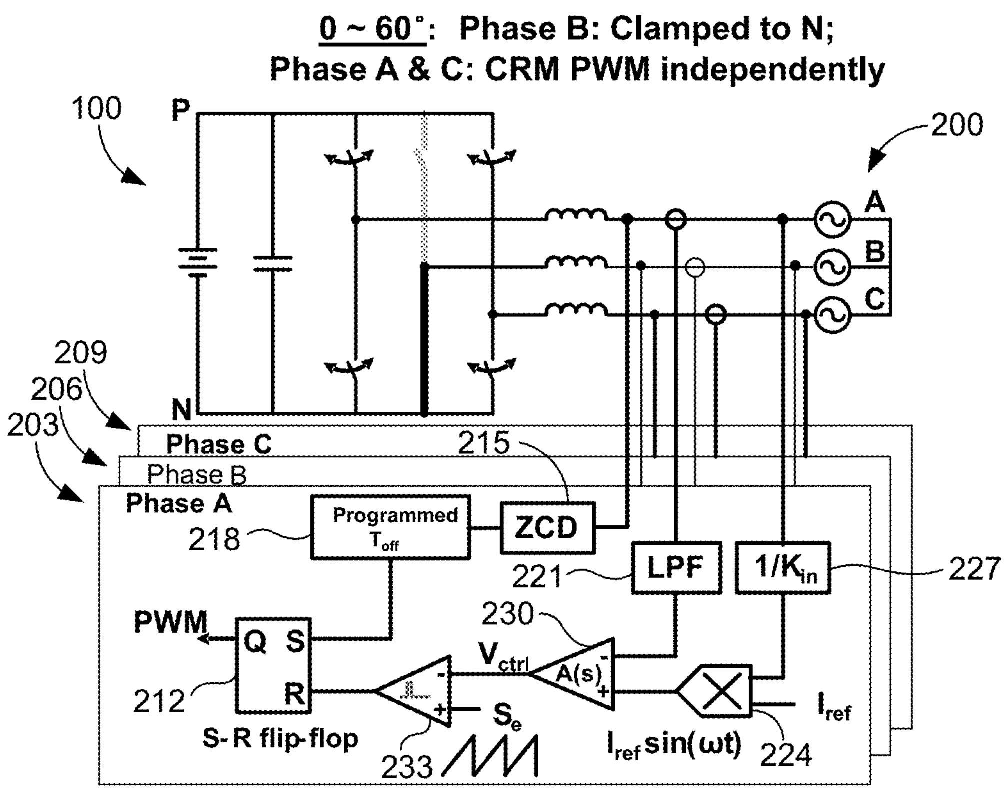
FIG. 3 illustrates an example of a control strategy using DPWM and critical conduction mode (CRM) modulation for a 0~60 degree DPWM clamping option as shown in FIG. 2B according to various examples described herein.

Thus, according to the concepts described herein, an inverter mode operation can be considered by adopting DPWM as a method of decoupling and using CRM control. In that context, FIG. 3 illustrates an example control strategy using DPWM and CRM. FIG. 3 illustrates an example of the three-phase two-level H-bridge structure 100 and three control blocks 203, 206, and 209, respectively, for the three phases A, B, and C for the structure 100. The control blocks 206 and 209 are similar in design to that shown for the control block 203. However, for the example shown, Phase B is clamped to the negative DC bus (similar to FIG. 2B), so the control block 206 for Phase B is inactive for this 60-degree time interval. Phase A and Phase C are controlled at CRM independently, so the control blocks 203 and 209 for these two phases are active.

In the control blocks 203 and 209 for Phase A and Phase C, the pulse width modulation (PWM) signal comes from the output of an S-R flip-flop 212, whose input S and input R are from two different parts in the control block. For the generation of the input S, the zero crossing point of the inductor current $I_{LA}$ is sensed by the zero-crossing-detector (ZCD) 215 for CRM operation. The off-time extender 218, which can be a programmed time $T_{off}$, provides a period of delay time from the inductor current zero crossing point to the turn-on instant, to ensure ZVS soft switching is achieved.

A pulse is generated by the logic unit 233 as a trigger input R to the S-R flip-flop 212 to trigger turn-off of the PWM signal. For the generation of the trigger input R, first the average inductor current is sensed by a current sensor fed through the low pass filter (LPF) 221. A sinusoidal reference current is also generated by a multiplier 224, multiplying a reference current amplitude $I_{ref}$ with a unity sine function from the proportional unit 227 ($1/K_{in}$, representing phase-locked loop, PLL). The difference between the sensed average current and reference current is passed through the current loop compensator 230 A(s) to generate the control signal $V_{ctrl}$. The control signal Vail represents the required on-time for the PWM signal.

The sawtooth signal $S_e$ is reset and starts to increase linearly after the turn-on of the PWM signal. As soon as $S_e$ incrementally reaches $V_{ctrl}$, the logic unit 233 generates a pulse signal as the trigger input R to the S-R flip-flop 212 to trigger turn-off of PWM signal. With this average current loop to determine the turn-on and turn-off instants, a good sinusoidal AC average current and power factor can be achieved. Both Phase A and Phase C are controlled independently using the average-current-mode-based CRM concept described above.

Figure 4A:
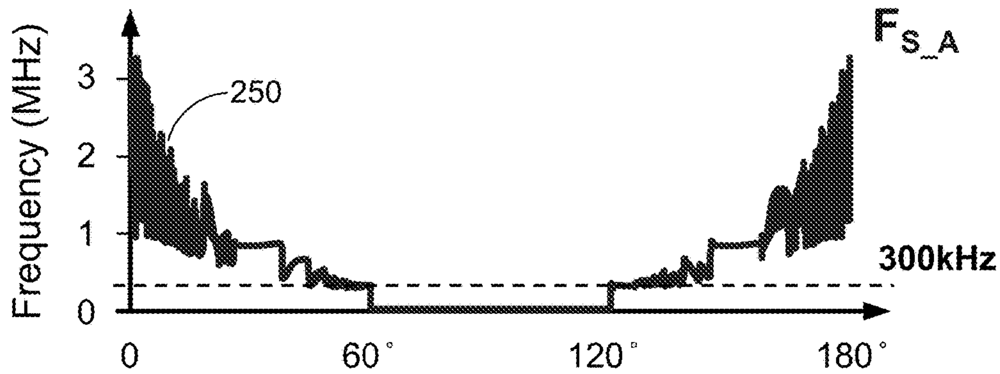
FIGS. 4A-4C illustrate an example of DPWM+CRM modulation switching frequency distribution in a half line cycle for phases A, B, and C, respectively, according to various examples described herein.
Figure 4B:
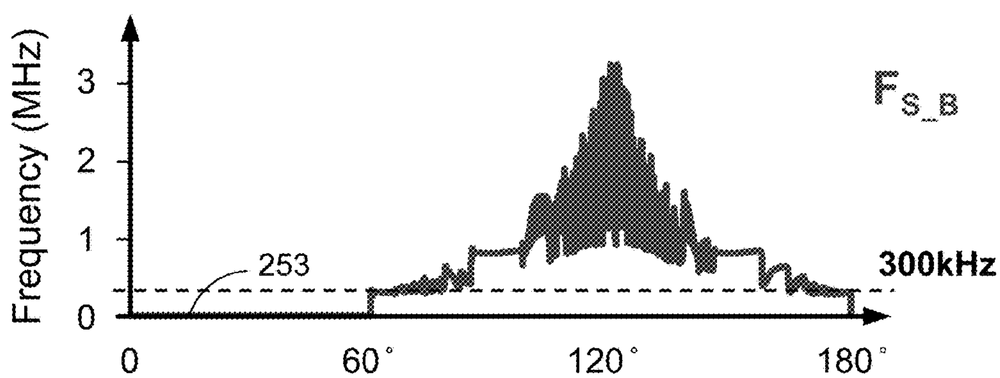
Figure 4C:
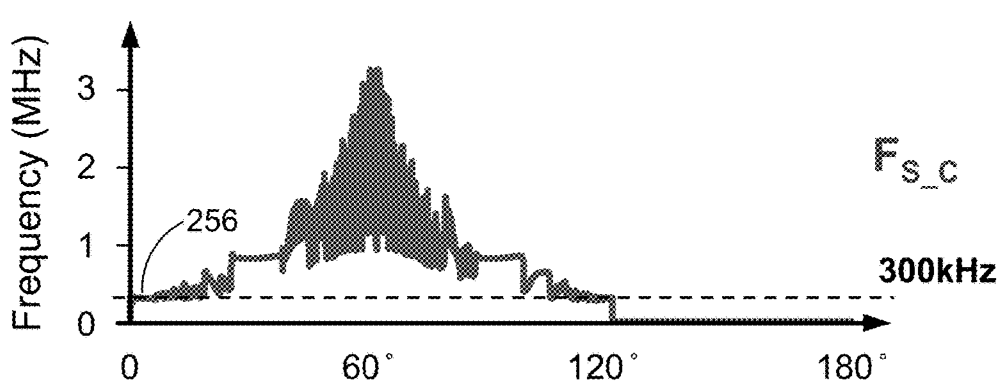

With this DPWM+CRM modulation, the switching frequency variation range is improved to some degree although it is still wide. In FIGS. 4A-4C, the switching frequency distribution in half line cycle for each of the three phases is shown. For example, in the first 30-degree time interval in the half line cycle, the Phase A switching frequency 250 is higher than that the Phase C switching frequency 256, while the Phase B switching frequency 253 remains zero due to clamping. This wide switching frequency variation range still causes large switching related loss. For example, as shown in FIGS. 4A-4C, the peak switching frequency is about 3 MHz for a minimum switching frequency at 300 kHz. Except for the phase operating at clamping mode, one phase operates at relatively higher switching frequency, while the other phase operates at relatively lower switching frequency.

Figure 5A:
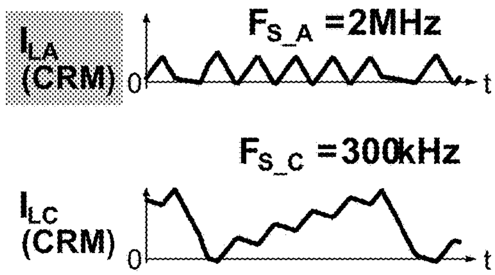
FIG. 5A illustrates an example of switching cycle inductor current waveforms over a 0~30 degree cycle interval, before switching frequency synchronization, according to various examples described herein.

To illustrate the switching frequency difference between the two phases which are not clamped, the switching-cycle waveforms of inductor current in Phase A ($I_{LA}$) and inductor current in Phase C ($I_{LC}$) at an arbitrarily selected instant in this 30-degree time interval are shown in FIG. 5A. To limit the switching frequency in Phase A during this 30-degree time interval, one way is to synchronize the switching frequency in Phase A to that in Phase C.

According to the concepts described herein, the operating mode of a first phase can be changed from CRM operation to discontinuous conduction mode (DCM) operation while the operating mode of a second phase remains in CRM operation to implement switching frequency synchronization (Fs sync). For example, in the first 30-degree time interval in the half line cycle, the operation mode in Phase A can be changed from CRM operation to discontinuous conduction mode (DCM) operation while Phase C still operates in CRM operation. For Fs sync, the turn-on instant in Phase A is synchronized to that in Phase C, which means the turn-on instants of both Phase A and Phase C are determined by the inductor current zero crossing in Phase C.

Figure 5B:
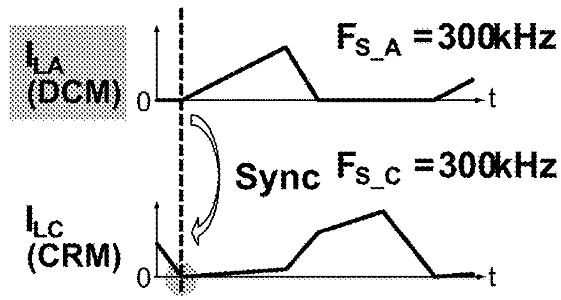
FIG. 5B illustrates an example of switching cycle inductor current waveforms over a 0~30 degree cycle interval, after switching frequency synchronization, according to various examples described herein.

To illustrate Fs sync, the waveforms of inductor current in Phase A and Phase C are shown before synchronization in FIG. 5A compared with the inductor currents after synchronization shown in FIG. 5B. With switching frequency synchronization, the switching frequency in Phase A is reduced to 300 kHz which is the switching frequency in Phase C. During the 30~60 degree interval, Phase C should operate at DCM operation, while Phase A still operates at CRM operation. Turn-on instants of Phase A and Phase C are both determined by inductor current zero crossing of Phase A. As noted previously, during the 0~60 degree period, Phase B is clamped.

Figure 6:
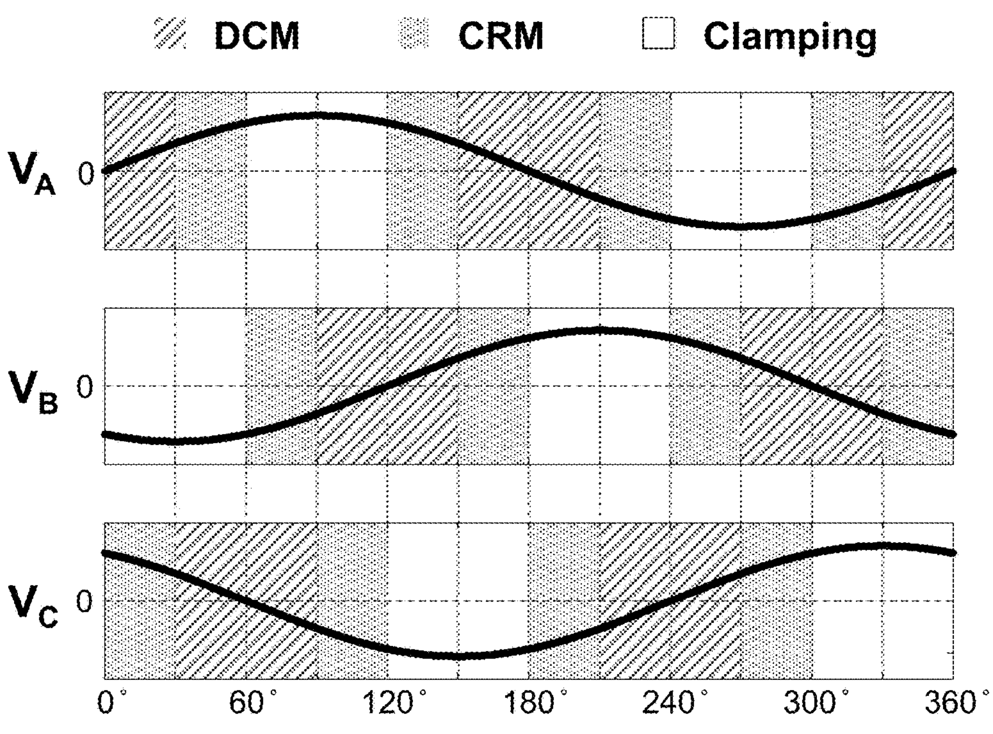
FIG. 6 illustrates an example of line cycle operation mode distribution with DPWM+CRM and switching frequency synchronization (Fs sync) modulation according to various examples described herein.

This control approach can be applied to the whole line cycle. The operating mode distribution of the three-phase inverter/rectifier with DPWM+CRM+Fs sync over the whole line cycle is shown in FIG. 6. The transition between clamping mode and CRM occurs every 60 degree, and the transition between CRM and DCM occurs at the midpoint instant of two adjacent clamping/CRM transition instants. For example, for 0~30 degrees, the control includes Phase A operating in DCM, Phase B clamped to negative, and Phase C operating in CRM. Next, for 30~60 degrees, the control includes Phase A operating in CRM, Phase B clamped to negative, and Phase C operating in DCM. Next, for 60~90 degrees, Phase A is clamped to positive, Phase B is operating in CRM, and Phase C is operating in DCM.

Figure 7:
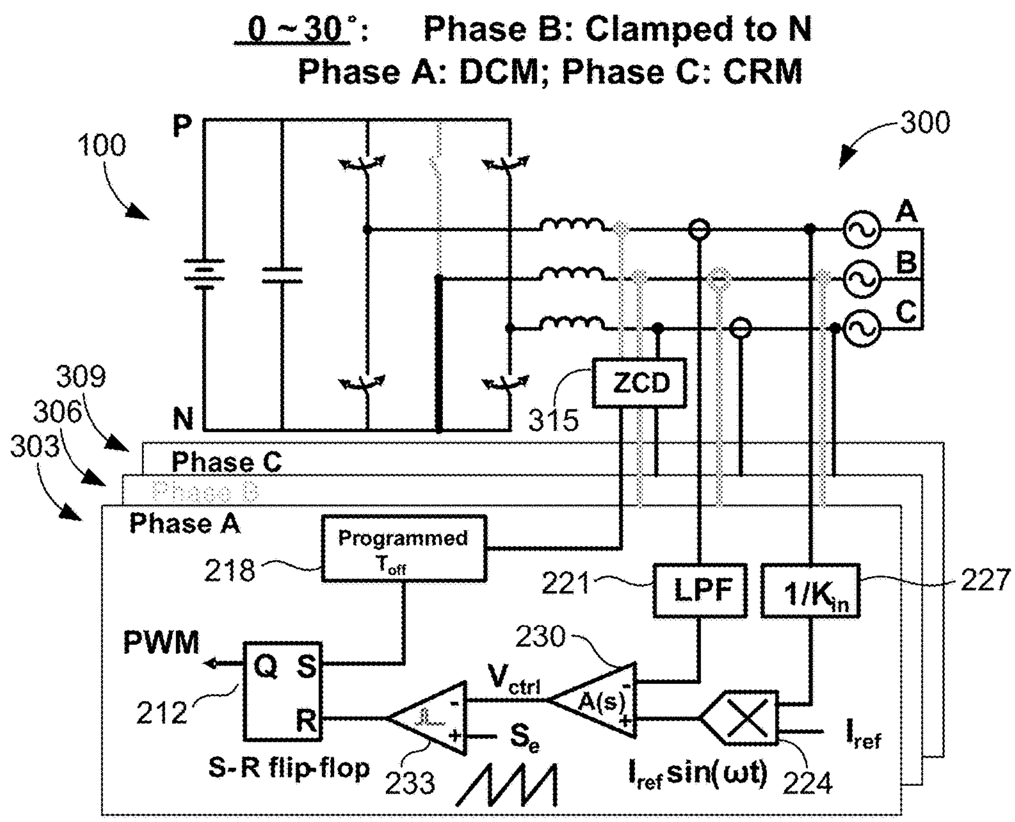
FIG. 7 illustrates an example of a DPWM+CRM+Fs sync modulation control strategy over a 0~30 degree cycle interval according to various examples described herein.

As an example, FIG. 7 illustrates a control system for DPWM+CRM+Fs sync modulation. In this example, the ZCD 315 is configured to interact with all three phases rather than for each single phase as previously shown in FIG. 3. For switching frequency synchronization, the inductor current zero crossing of the phase operating in CRM (for example, phase C during 0~30 degree) becomes a decision point to turn on the control switches in both phases operating in high-frequency PWM, instead of using the individual inductor current zero crossing in each phase as a decision point. For example, for 0~30 degrees, Phase A syncs to Phase C, and thus the inductor current zero crossing in Phase C is detected to determine the turn-on instants in both Phase A and Phase C shown in FIG. 7. For 30~60 degrees, Phase C syncs to Phase A. For 60~90 degrees, Phase C syncs to Phase B.

Figure 8A:
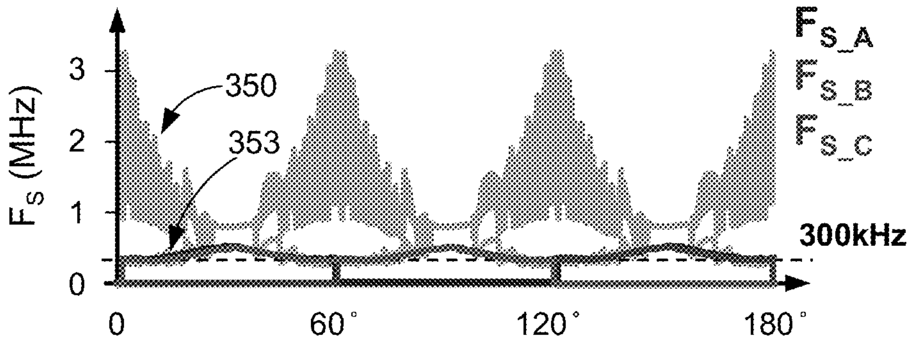
FIG. 8A illustrates an example of switching frequency distribution after synchronization compared to before synchronization according to various examples described herein.
Figure 8B:
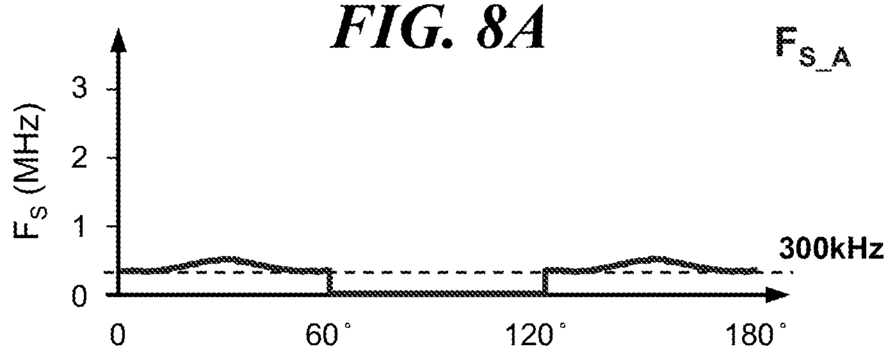
FIGS. 8B-8D illustrate an example of switching frequency distribution, for phase A, B, and C, respectively, after synchronization using DPWM+CRM+Fs sync modulation control strategy according to various examples described herein.
Figure 8C:
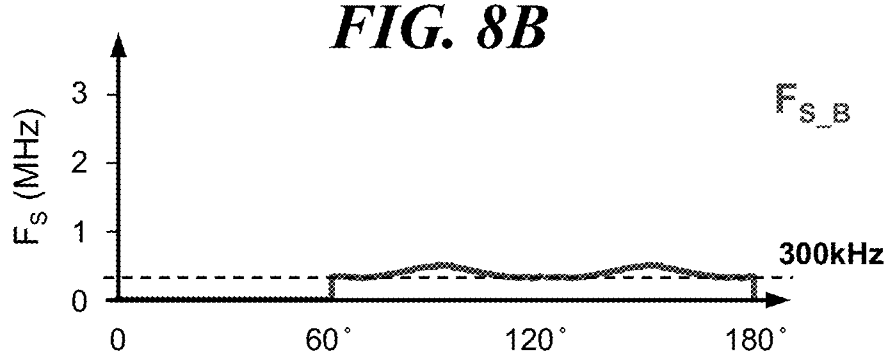
Figure 8D:
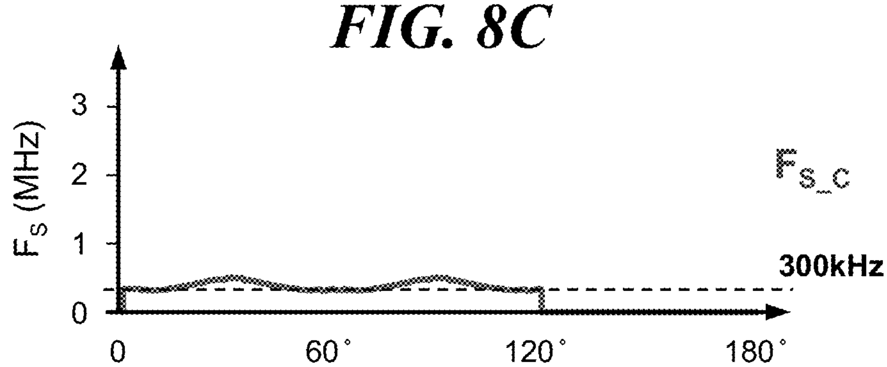

With switching frequency synchronization, there is a significant change in the switching frequency variation range. A comparison of the switching frequency distribution in three phases before 350 and after synchronization 353 over half line cycle is shown in FIG. 8A, keeping the minimum switching frequency the same as 300 kHz. The switching frequency for each phase is shown in FIGS. 8B-8D. The switching frequency variation range shrinks after synchronization, with peak switching frequency only around 500 kHz, which significantly reduces switching related loss.

For grid-tied inverter applications, the capability of delivering reactive power is important for grid voltage regulation. The DPWM+CRM+Fs sync modulation control was introduced under unity power factor (PF=1) condition above, but the control can also be operated under conditions of non-unity power factor (PF≠1).

Figure 9A:
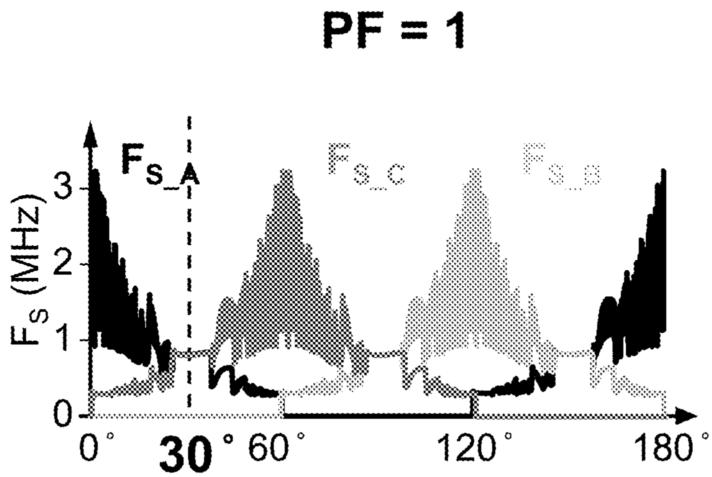
FIG. 9A illustrates an example of switching frequency distribution for all three phases, before synchronization at a power factor equal to unity (PF=1) according to various examples described herein.
Figure 9B:
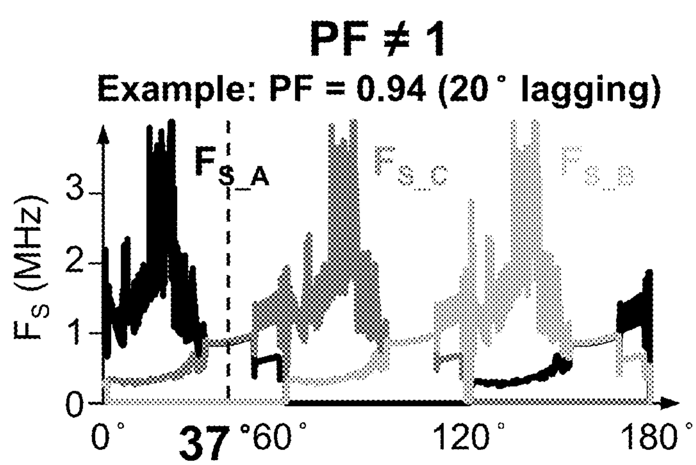
FIG. 9B illustrates an example of switching frequency distribution for all three phases, before synchronization at a power factor not equal to unity (PF≠1) according to various examples described herein.

Under the PF≠1 condition, the DPWM clamping is determined by the peak and polarity of the AC side line-to-neutral voltage, which is the same as the PF=1 condition. However, the transition instant between CRM and DCM is different. Since the CRM/DCM transition instant is determined by switching frequency distribution before switching frequency synchronization, FIG. 9 shows the comparison of this switching frequency distribution between PF=1 condition and PF=0.94, which is an example of PF≠1 condition. During the first 60-degree time interval, at PF=1, before the 30-degree instant, Phase A with higher switching frequency should be synchronized to Phase C with lower switching frequency, and Phase A and Phase C operate at DCM and CRM respectively. After the 30-degree instant, Phase C with higher switching frequency should be synchronized to Phase A with lower switching frequency, and Phase A and Phase C operate at CRM and DCM respectively. Thus, 30-degree instant is a CRM/DCM transition instant (angle) at PF=1. However, at PF=0.94, it is before 37-degree instant that Phase A has higher switching frequency than Phase C, while after 37-degree instant Phase C has higher switching frequency than Phase A, which means that the CRM/DCM transition instant (angle) is changed to 37 degree. Therefore, at PF=0.94, during 0~37 degree, Phase A should be operating at DCM and synchronized to Phase C, while during 37~60 degree, Phase C should be operating at DCM and synchronized to Phase A.

Figure 10A:
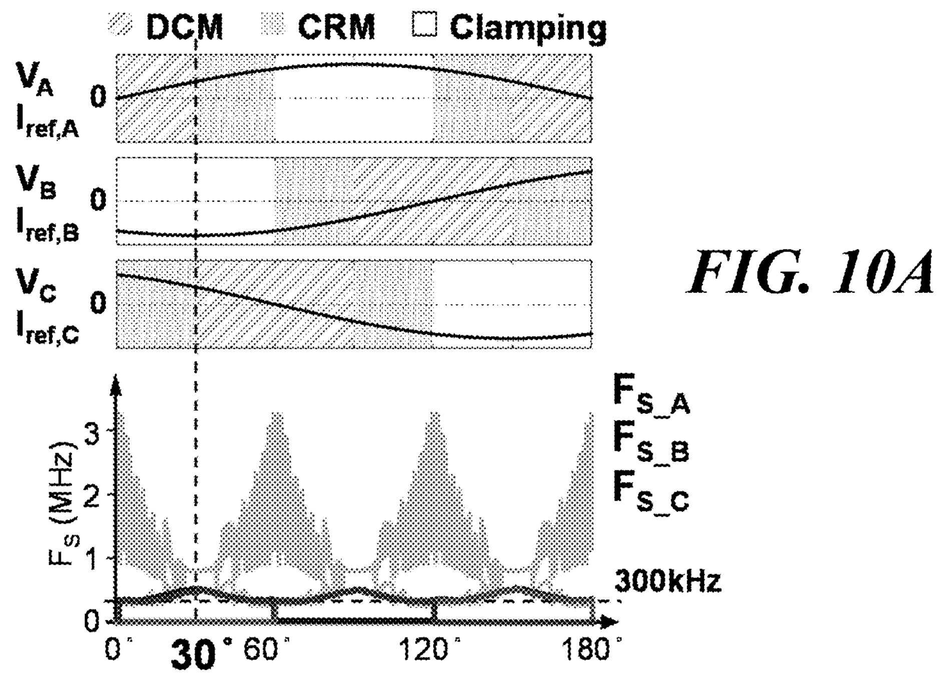
FIGS. 10A and 10B illustrate examples of half line cycle operation mode and switching frequency distribution after synchronization at PF=1 (FIG. 10A) and PF≠1 (FIG. 10B) according to various examples described herein.
Figure 10B:
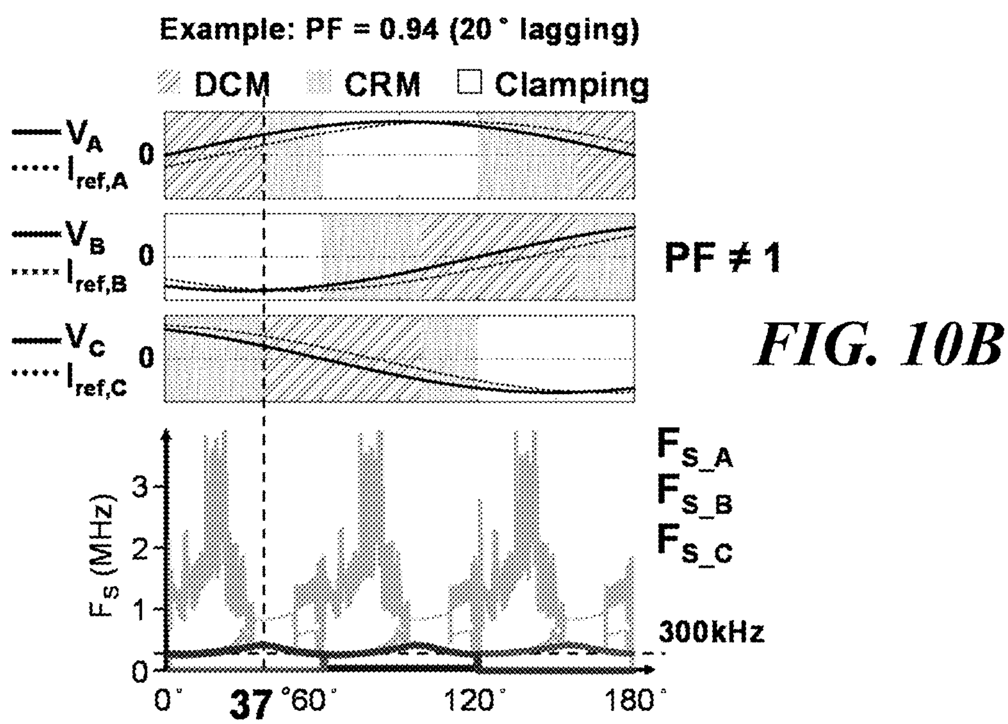

After applying the DPWM clamping and switching frequency synchronization to the whole line cycle, the operating mode and switching frequency distributions in three phases after switching frequency synchronization are shown in FIG. 10 for PF=1 and PF=0.94 conditions. In PF=0.94 condition, there is significant reduction in the range of switching frequency variation.

The CRM/DCM transition instant (angle) can be pre-determined by calculation. Based on the principle of per-cycle balanced volt-second at DCM or CRM operation, and the assumption that per-cycle average inductor current is well controlled as AC reference current, constraints can be derived. Then, on-time ($T_{on}$) and off-time ($T_{off}$) in Phase A and Phase C can be solved. During the first 60-degree time interval, by sweeping the AC voltage phase angle from 0 to 60 degree, if for a specific AC voltage phase angle, $T_{on}+T_{off}$ in Phase A is equal to $T_{on}+T_{off}$ in Phase C, then this AC voltage phase angle is the desired CRM/DCM transition angle.

Figure 11:
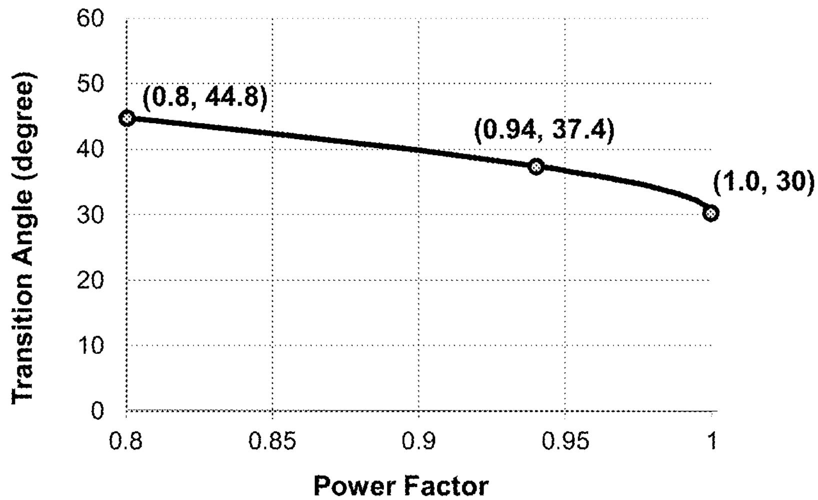
FIG. 11 illustrates an example relation between CRM/discontinuous conduction mode (DCM) transition angle and power factor according to various examples described herein.

At 800V DC side voltage and 480V AC side line-to-line RMS voltage with DPWM+CRM+Fs sync modulation, an example relation between CRM/DCM transition angle and power factor is shown in FIG. 11. At the same power factor condition, the CRM/DCM transition angle is dependent on the modulation index (the ratio of AC side line-to-line peak voltage to DC side voltage), but not dependent on load or inductance.

Besides the above mentioned calculation-based method, an alternative sensing-based method can also be used to determine the CRM/DCM transition angle. The basic concept is described as below. The inductor current zero crossing points in the two phases operating at high-frequency PWM are sensed. (For example, during first 60-degree interval in line cycle, the inductor current zero crossing points in phase A and phase C need to be sensed.) The control switches in these two phases will not be turned on until the inductor currents in both these two phases have already touched zero. This concept can be implemented by making the ZCD 315 in FIG. 7 sense the inductor current zero crossing points in these two phases and give a pulse signal when the zero crossings have occurred in both these two phases. With this sensing-based method, a natural CRM/DCM transition can be achieved. (For example, at PF=0.94 lagging condition, during 0~37 degree, phase A naturally operates at DCM and phase C naturally operates at CRM; during 37~60 degree, phase C naturally operates at CRM and phase A naturally operates at DCM.) This sensing-based method is applicable to both unity and non-unity power factor conditions.

A generalized DPWM+CRM+Fs sync modulation control, which is applicable to both PF=1 and PF≠1 conditions, is summarized below. In this modulation, the DPWM clamping is determined by the peak and polarity of AC side line-to-neutral voltage, and the CRM/DCM transition angle is pre-determined by calculation or based on ZCD sensing. Based on these two rules, the operation mode distribution in all three phases during the whole line cycle can be determined.

Figure 12:
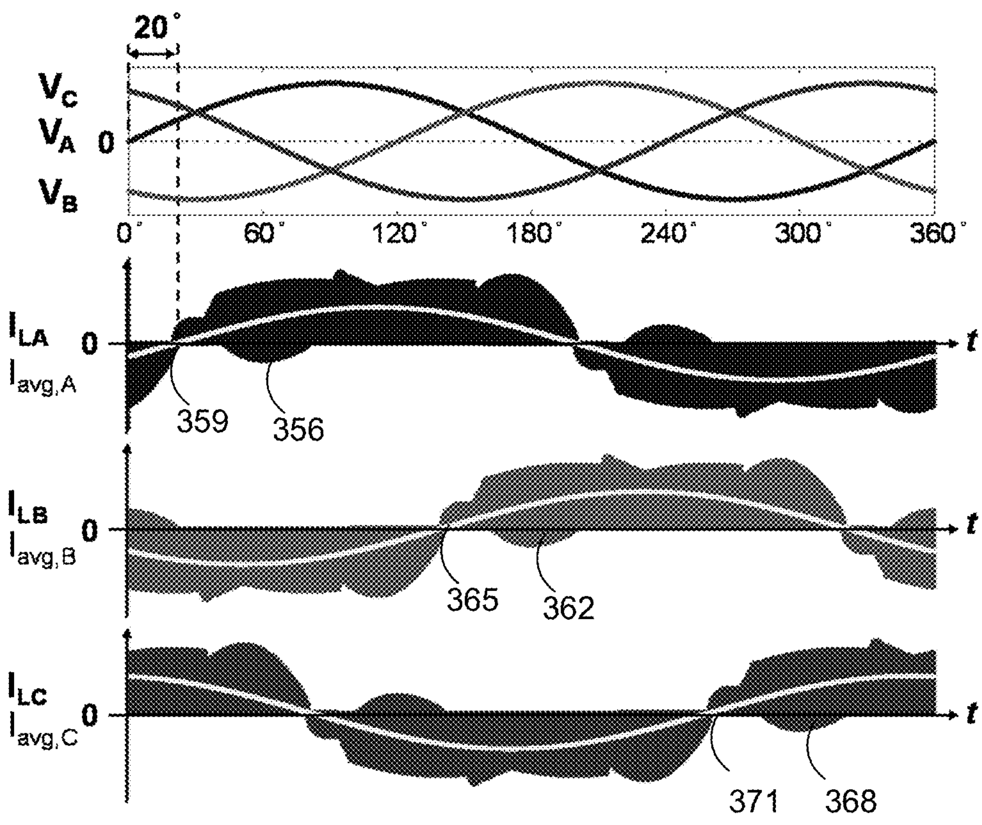
FIG. 12 illustrates an example of simulation verification at PF=0.94 (20 degree lagging) condition according to various examples described herein.

FIG. 12 shows the simulation verification at PF=0.94 (20 degree lagging) condition with the generalized DPWM+CRM+Fs sync modulation control, including the waveforms of the AC side line-to-neutral voltages, inductor currents 356, 362, 368, and AC average currents in three phases 359, 365, 371. The AC current lags the AC voltage by 20 degrees. This generalized DPWM+CRM+Fs sync modulation is also applicable to leading PF (where AC current leads AC voltage) conditions, zero PF (PF=0, where AC current lags or leads AC voltage by 90 degrees) conditions, and rectifier mode operation (both PF=1 and PF≠1).

Large current ripple is a drawback of CRM operation, which requires large AC side harmonic filters to meet the standard of harmonic components. Large current ripple also causes large differential mode (DM) electromagnetic interference (EMI) noise and requires large DM EMI filters to meet EMI standards. In order to overcome this drawback, multi-channel interleaving is widely used for current ripple cancellation and filter size reduction.

Figure 13:
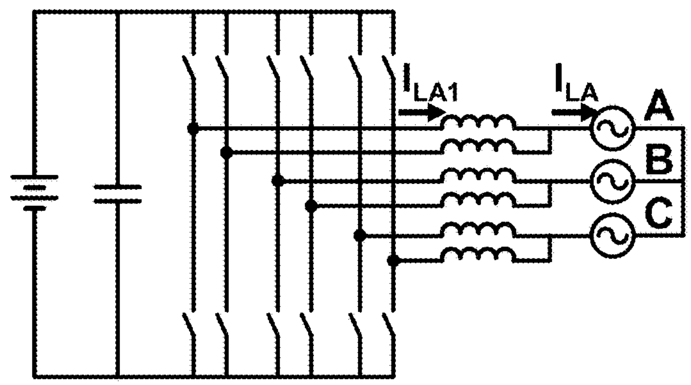
FIG. 13 illustrates an example circuit of three-phase H-bridge inverter/rectifier with two channels in each phase according to various examples described herein.

Therefore, an example of two-channel interleaving is also applied to the concepts describe herein. An additional phase leg (channel) is added into each phase as shown in FIG. 13, and the two channels in each phase are controlled to be interleaved with each other, which means these two channels operate with 180-degree phase-shift in each switching cycle. The open-loop interleaving control method, which is more suitable for the digital controlled system with high switching frequency operation, is applied here for the implementation of the two-channel interleaving.

Figure 14A:
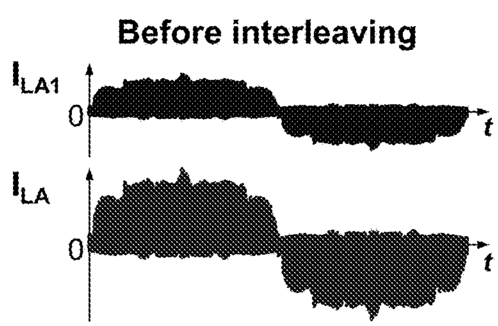
FIG. 14A illustrates an example of individual inductor current waveforms and total AC current waveforms before interleaving according to various examples described herein.
Figure 14B:
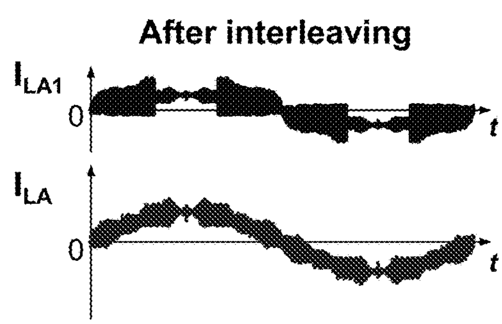
FIG. 14B illustrates an example of individual inductor current waveforms and total AC current waveforms after interleaving according to various examples described herein.

FIG. 14A illustrates an example of line-cycle individual inductor current waveforms and total inductor current waveforms before interleaving, and FIG. 14B illustrates an example of line-cycle individual inductor current waveforms and total inductor current waveforms after interleaving according to various examples described herein. Between them, FIGS. 14A and 14B show a comparison of waveforms of an individual inductor current and the total inductor current in one phase before and after interleaving under the same power delivery with the use of DPWM+CRM+Fs sync modulation control. Before interleaving, the two channels in each phase operate in phase. After interleaving, the two channels in each phase operate with 180-degree phase-shift. The currents $I_{LA1}$ and $I_{LA}$ for Phase A are shown in FIGS. 14A and 14B and are designated in FIG. 13. The ripple in the total inductor current is reduced after interleaving, which is the main benefit of two-channel interleaving to achieve the size reduction of EMI filter. The ripple reduction in the individual inductor current brings about 20% conduction loss reduction according to simulation because of DPWM clamping, which is an additional benefit of the application of interleaving to the proposed DPWM+CRM+Fs sync modulation control.

The DPWM+CRM+Fs sync modulation control can be operated in both inverter mode and rectifier mode. However, when operating in rectifier mode, there are two issues related to this modulation. The first issue is non-ZVS. In inverter mode, under typical operating conditions (e.g., $V_{DC}$=800V, $V_{AC,\ L\text{-}L(RMS)}$=480V), ZVS turn-on can be achieved naturally during CRM operation.

Figure 15:
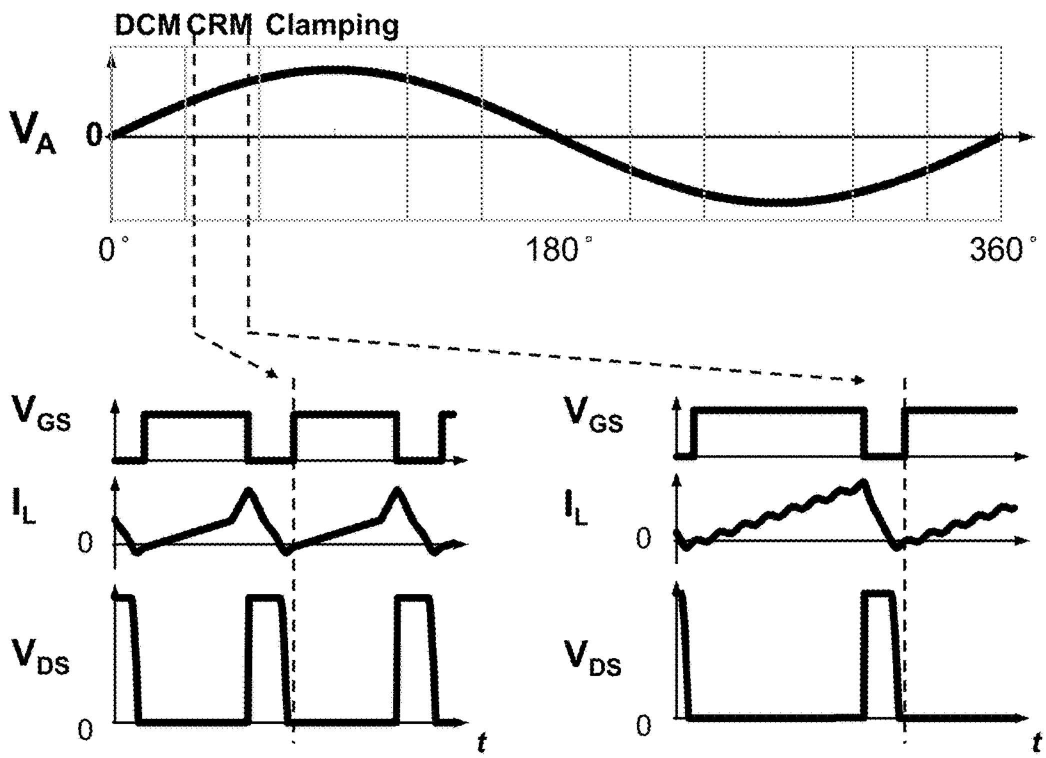
FIG. 15 illustrates an example of switching cycle waveforms in inverter mode during CRM operation (zero-voltage-switching (ZVS) is naturally achieved) according to various examples described herein.

FIG. 15 shows switching-cycle waveforms of a gate-drive signal for a control switch. FIG. 15 also shows inductor current and drain-source voltage for a control switch at two arbitrarily selected instants during CRM operation. After the inductor current zero crossing (from positive current to negative current) occurs, the negative inductor current caused by LC resonance is beneficial to discharging the drain-source voltage of control switch. At each of the two selected instants, it can be seen that the drain-source voltage can be discharged to zero during the LC resonance period. This is true for any instant during CRM operation, which indicates that ZVS is achieved naturally in inverter mode.

Figure 16:
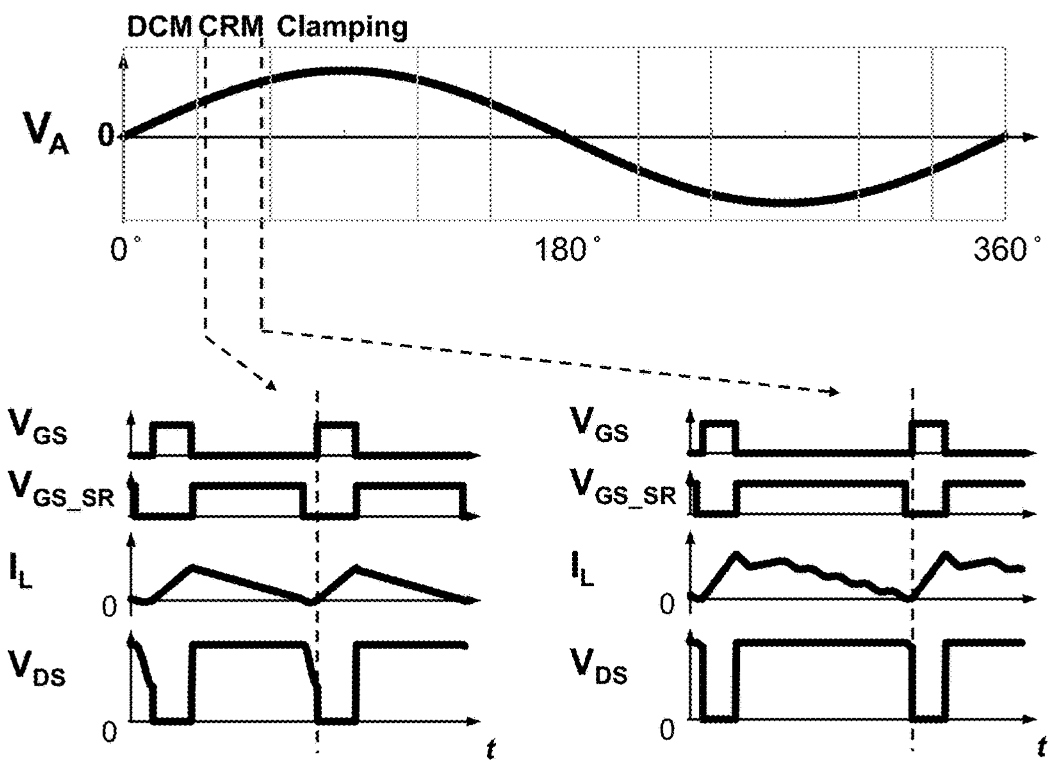
FIG. 16 illustrates an example of switching cycle waveforms in rectifier mode during CRM operation (Non-ZVS) according to various examples described herein.

However, in rectifier mode, under the same operating condition, ZVS turn on cannot be achieved naturally during CRM operation. FIG. 16 shows switching-cycle waveforms of gate drive signals (of both the control switch and the synchronous rectifier, SR), inductor current and drain-source voltage of control switch at two instants (selected the same as in FIG. 15) during CRM operation. In CRM operation, the SR is turned off immediately after the inductor current zero crossing occurs. At each instant, the drain-source voltage is not discharged to zero during the LC resonance period. This is true for any instant during CRM operation, which indicates that ZVS cannot be achieved naturally in rectifier mode.

Figure 17:
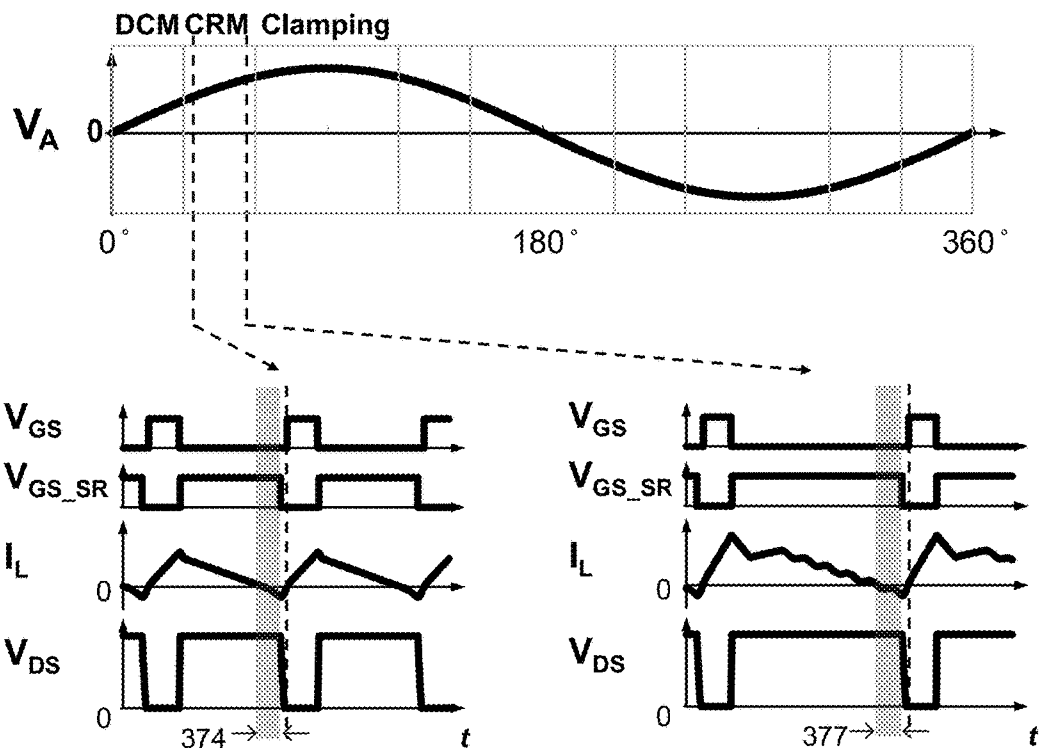
FIG. 17 illustrates an example of switching cycle waveforms in rectifier mode during CRM operation with off-time extension (ZVS is achieved) according to various examples described herein.

The reason for the non-ZVS in rectifier mode is that, during the LC resonance period after inductor current zero crossing occurs, the negative current is not enough to fully discharge the junction capacitor of the control switch. In order to provide sufficient negative current to achieve ZVS after the inductor current zero crossing point, the off-time is extended by making SR purposely conduct for an extra period of time. With this off-time extension, FIG. 17 shows switching-cycle waveforms of gate drive signals (of both the control switch and the SR). FIG. 17 also shows the inductor current and drain-source voltage of the control switch at two instants selected the same as in FIG. 15 during CRM operation. It can be seen that with the off-time extension 374 and 377, at each instant, the drain-source voltage can be discharged to zero during the LC resonance period after SR is turned off. This is true for any instant during CRM operation, which indicates that ZVS is also achieved in rectifier mode. Therefore, the off-time extension can be relied upon in rectifier mode to achieve ZVS.

Whether ZVS can be naturally achieved is also dependent on the modulation index (the ratio of AC side line-to-line peak voltage to DC side voltage). From simulation, higher DC side voltage or lower AC side voltage will make it harder to discharge the junction capacitor of the control switch in inverter mode and easier to discharge the junction capacitor of the control switch in rectifier mode.

From simulation, for a modulation index higher than 0.48 (e.g., $V_{DC}$=1000 V, $V_{AC,L\text{-}L\ (RMS)}$=480V), ZVS can be achieved naturally during the whole line cycle in inverter mode, but cannot be achieved at any instant during the whole line cycle in rectifier mode. When the modulation index is lower, ZVS cannot be achieved naturally at some instants in inverter mode and ZVS can be achieved naturally at some instants in rectifier mode.

Figure 18A:
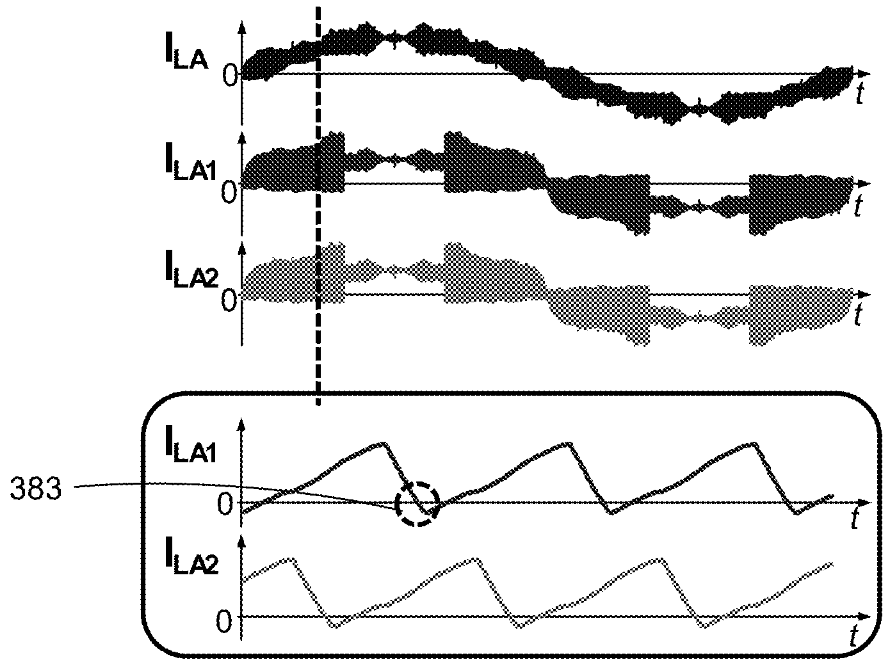
FIG. 18A illustrates an example of current waveforms with interleaving in inverter mode (no oscillation) according to various examples described herein.
Figure 18B:
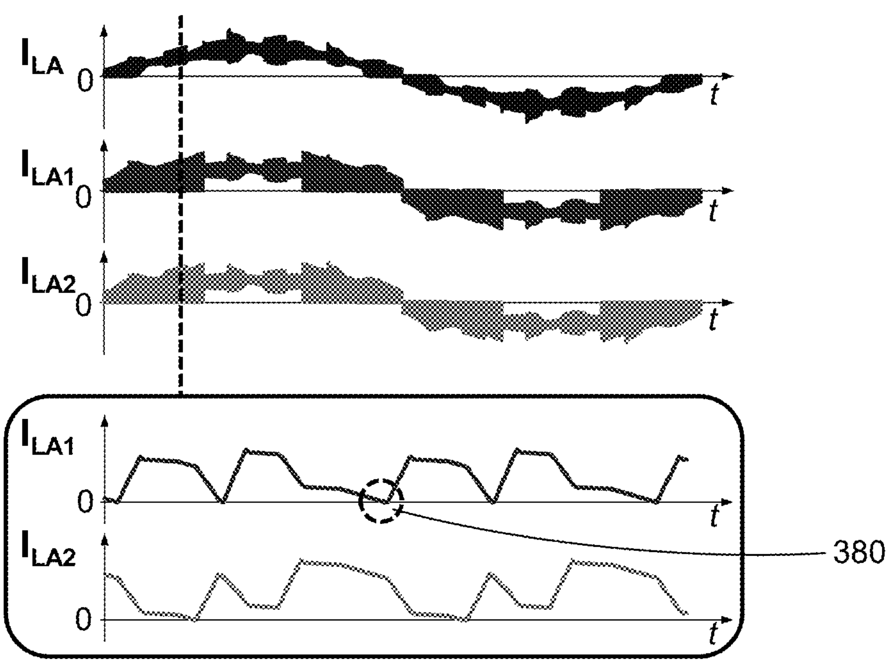
FIG. 18B illustrates an example of current waveforms with interleaving in rectifier mode (oscillation) according to various examples described herein

The second issue is the sub-harmonic oscillation with interleaving. In inverter mode, there is no sub-harmonic oscillation issue. In rectifier mode, there is sub-harmonic oscillation. FIGS. 18A and 18B show the line-cycle and zoomed-in switching-cycle current waveforms in one phase, including the total inductor current ($I_{LA}$) and two individual inductor currents (master: $I_{LA1}$ and slave: $I_{LA2}$) in inverter mode and rectifier mode, respectively. It can be clearly seen that in rectifier mode, sub-harmonic oscillation exists, which makes slave channel current ($I_{LA2}$) even go into continuous conduction mode (CCM) and lose ZVS. From the comparison, it can be found that the main reason of the sub-harmonic oscillation in rectifier mode is that the current ramp before master channel inductor current ($I_{LA1}$) zero crossing point is very small as shown at reference numeral 380, while this current ramp in inverter mode is quite large as shown at reference numeral 383. The small current ramp will make the small signal modulation gain and bandwidth become high, and thus there is insufficient phase margin to maintain stable operation when there is perturbation.

Figure 19:
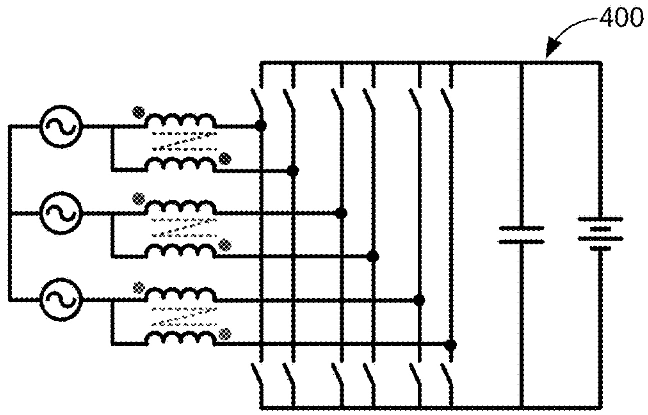
FIG. 19 illustrates an example of a three-phase inverter/rectifier circuit with negative coupled inductors according to various examples described herein.

The sub-harmonic oscillation issue in two-channel-interleaved rectifier mode can be solved by using negative coupled inductors, which means that in each phase, the two individual inductors are inversely coupled with each other. The circuit diagram with negative coupled inductor is shown in FIG. 19.

Figure 20A:
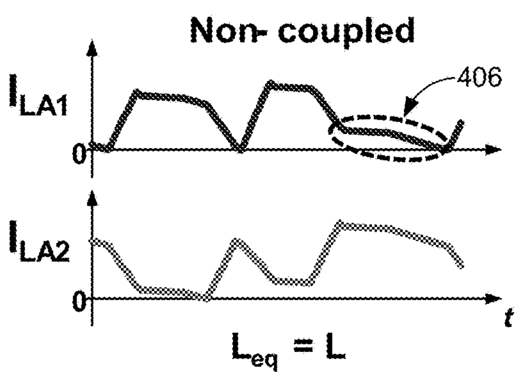
FIG. 20A illustrates an example of individual inductor current waveforms in interleaved rectifier mode without negative coupling according to various examples described herein.
Figure 20B:
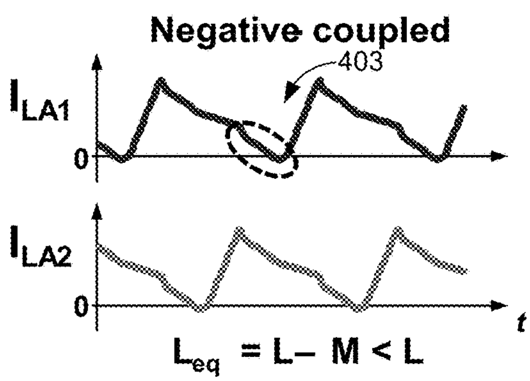
FIG. 20B illustrates an example of individual inductor current waveforms in interleaved rectifier mode with negative coupling according to various examples described herein.

The reason why negative coupled inductor can eliminate sub-harmonic oscillation is that it increases the current ramp by changing equivalent inductance before master channel inductor current zero crossing point. FIGS. 20A and 20B show the comparison between the individual inductor current waveforms without and with negative coupled inductors, respectively. It can be seen that the negative coupled inductor makes the equivalent inductance before the master channel inductor current zero crossing point smaller, and thus increase the current ramp 403 compared to the non-coupled current ramp 406. The larger current ramp makes the small signal modulation gain become lower, and thus provides larger phase margin to maintain stable operation and eliminate the unstable sub-harmonic oscillation.

It should also be noted that the negative coupling should be strong enough to eliminate the sub-harmonic oscillation. From simulation, the boundary of negative coupling coefficient is about 0.45 under the typical operating conditions (e.g., $V_{DC}$=800V, $V_{AC,\ L\text{-}L\ (RMS)}$=480V). The negative coupling coefficient boundary is related to the modulation index (the ratio of AC side line-to-line peak voltage to DC side voltage). A decrease in the AC side voltage or an increase in the DC side voltage results in smaller value of negative coupling coefficient boundary.

Figure 21:
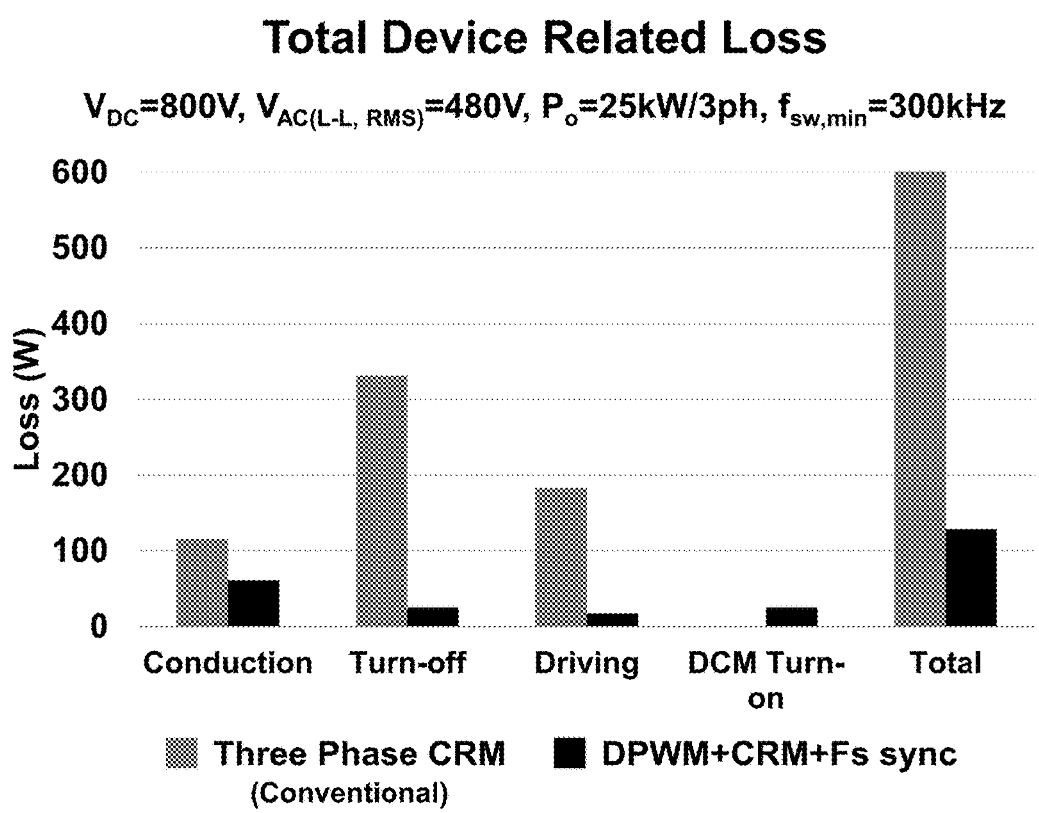
FIG. 21 illustrates a graph comparing device related loss between a conventional three-phase CRM method (three-level T-type with split capacitors and additional connection to decouple three phases) and DPWM+CRM+Fs sync modulation for soft switching according to various examples described herein.

Finally, a comparison of simulated device related loss between a conventional three-phase CRM method (three-level T-type with split capacitors and additional connection to decouple three phases) and DPWM+CRM+Fs sync modulation control is shown in FIG. 21. It can be seen that with DPWM+CRM+Fs sync modulation control, the device related loss has a significant reduction and is only around 0.5% of total power, which indicates that the DPWM+CRM+Fs sync modulation control is a high-efficiency solution for three-phase CRM inverter/rectifier, even when operating at above 300 kHz high switching frequency.

The components described herein, including the control loops 203, 206, 209, 303, 306, and 309 can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter, comprising:

a converter electrically coupled between an alternating current (AC) power system and a direct current (DC) power system, the converter comprising a number of phase legs; and a control system for the converter configured, during a portion of a whole line cycle of the AC power system, to:

clamp a first phase leg of the converter from switching; and during a first cycle in the portion of the whole line cycle, operate a second phase leg of the converter in critical conduction mode (CRM) and operate a third phase leg of the converter in discontinuous conduction mode (DCM).

2. The power converter of claim 1, wherein the control system is further configured, during a second cycle in the portion of the whole line cycle, to:

operate the second phase leg of the converter in DCM; and operate the third phase leg of the converter in CRM.

3. The power converter of claim 2, wherein:

the portion of the whole line cycle comprises a 60-degree time interval; and at a unity power factor condition, the first cycle in the portion of the whole line cycle comprises about a first 30-degree time interval, and the second cycle in the portion of the whole line cycle comprises a second 30-degree time interval.

4. The power converter of claim 2, wherein:

the portion of the whole line cycle comprises a 60-degree time interval; and the control system is further configured, at a non-unity power factor condition, to:

determine a CRM/DCM transition angle in the portion of the whole line cycle; and operate the second phase leg and the third phase leg of the converter to correspond with the CRM/DCM transition angle.

5. The power converter of claim 1, wherein the control system is further configured to clamp the first phase leg of the converter to one of a negative bus of the DC power system or a positive bus of the DC power system.

6. The power converter of claim 1, wherein the control system comprises a separate control block for each of phase legs.

7. The power converter of claim 1, wherein the control system further comprises a zero crossing detector (ZCD) configured to sense a zero crossing point of current between the AC power system and the DC power system for each of the phase legs of the converter.

8. The power converter of claim 7, wherein:

a switching frequency of the third phase leg is synchronized to a switching frequency of the second phase leg;

a turn-on of the second phase leg is determined by the zero crossing point; and a turn-on of the third phase leg is determined by at least one of the turn-on or a turn-off of the second phase leg.

9. The power converter of claim 1, wherein each of the phase legs includes two channels interleaved with each other with 180-degree phase shift in each switching cycle.

10. The power converter of claim 1, wherein the converter is operated in inverter mode to transfer power from the DC power system to the AC power system.

11. The power converter of claim 1, wherein the converter is operated in rectifier mode to transfer power from the AC power system to the DC power system.

12. The power converter of claim 11, wherein control system is further configured to extend a switch off time period of a switch in the converter after an inductor current zero crossing occurs to discharge a junction capacitor of the switch to achieve zero-voltage-switching (ZVS) soft switching turn-on in rectifier mode.

13. The power converter of claim 11, wherein the converter includes at least one negative coupled inductor to reduce sub-harmonic oscillation in interleaved rectifier mode.

14. A power converter, comprising:

a converter electrically coupled between a first power system and a second power system, the converter comprising a number of phase legs; and a control system for the converter configured, during a portion of a whole line cycle of the first power system, to:

clamp a first phase leg of the converter from switching; and during a first cycle in the portion of the whole line cycle, operate a second phase leg of the converter in critical conduction mode (CRM) and operate a third phase leg of the converter in discontinuous conduction mode (DCM).

15. The power converter of claim 14, wherein the control system comprises a separate control block for each of phase legs.

16. The power converter of claim 14, wherein the control system further comprises a zero crossing detector (ZCD) configured to sense a zero crossing point of current between the first power system and the second power system for each of the phase legs of the converter.

17. The power converter of claim 16, wherein:

a switching frequency of the third phase leg is synchronized to a switching frequency of the second phase leg;

a turn-on of the second phase leg is determined by the zero crossing point; and a turn-on of the third phase leg is determined by at least one of the turn-on or a turn-off of the second phase leg.

18. The power converter of claim 14, wherein a switching frequency for the converter ranges from 300 kHz to 700 kHz.

19. The power converter of claim 14, wherein each of the phase legs includes two channels interleaved with each other with 180-degree phase shift in each switching cycle.

20. A power converter, comprising:

a converter electrically coupled between a first power system and a second power system, the converter comprising a number of phase legs; and a control system for the converter, the control system comprising a zero crossing detector (ZCD) configured to sense a zero crossing point of current between the first power system and the second power system for each of the phase legs of the converter, the control system being configured, during a portion of a whole line cycle of the first power system, to:

clamp a first phase leg of the converter from switching; and operate a second phase leg of the converter in critical conduction mode (CRM); and operate a third phase leg of the converter in discontinuous conduction mode (DCM), wherein:

a switching frequency of the third phase leg is synchronized to a switching frequency of the second phase leg;

a turn-on of the second phase leg is determined by the zero crossing point; and a turn-on of the third phase leg is determined by at least one of the turn-on or a turn-off of the second phase leg.

* * * * *